United States Patent
Yu et al.

(10) Patent No.: US 9,461,697 B2
(45) Date of Patent: Oct. 4, 2016

(54) IN-SERVICE MONITORING AND CANCELLATION OF PASSIVE INTERMODULATION INTERFERENCES

(71) Applicant: Scintera Networks LLC, Wilmington, DE (US)

(72) Inventors: Qian Yu, Santa Clara, CA (US); Yan Wang, Sunnyvale, CA (US); Olivier Charlon, San Francisco, CA (US); Rajeev Krishnamoorthy, Saratoga, CA (US)

(73) Assignee: Scintera Networks LLC, Wilmington, DE (US)

( * ) Notice: Subject to any disclaimer, the term of this patent is extended or adjusted under 35 U.S.C. 154(b) by 81 days.

(21) Appl. No.: 14/192,513

(22) Filed: Feb. 27, 2014

(65) Prior Publication Data

US 2015/0244414 A1 Aug. 27, 2015

(51) Int. Cl.
| | | |
|---|---|---|
| *H04B 1/52* | (2015.01) | |
| *H04B 1/10* | (2006.01) | |
| *H04B 15/00* | (2006.01) | |
| *H04Q 1/00* | (2006.01) | |
| *H04B 1/525* | (2015.01) | |
| *H04Q 1/20* | (2006.01) | |

(52) U.S. Cl.
CPC .............. *H04B 1/525* (2013.01); *H04B 1/109* (2013.01); *H04B 15/00* (2013.01); *H04Q 1/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0202571 A1* | 10/2003 | Kearney | .............. | H04B 17/391 375/224 |
| 2010/0048146 A1* | 2/2010 | McCallister | ........... | H04B 1/525 455/78 |
| 2010/0197231 A1* | 8/2010 | Kenington | ............. | H04B 1/525 455/63.1 |
| 2013/0044791 A1* | 2/2013 | Rimini | ................... | H04B 1/109 375/219 |
| 2013/0310090 A1* | 11/2013 | Bevan | .................. | H04B 1/1027 455/501 |
| 2014/0036969 A1* | 2/2014 | Wyville | ................... | H04B 1/38 375/219 |
| 2014/0133364 A1* | 5/2014 | Weissman | ............ | H04B 1/0057 370/273 |
| 2014/0161005 A1* | 6/2014 | Laurent-Michel | ..... | H04B 1/525 370/281 |
| 2015/0078422 A1* | 3/2015 | Shen | ........................ | H04B 1/40 375/219 |

FOREIGN PATENT DOCUMENTS

| | | | | | |
|---|---|---|---|---|---|
| WO | WO 0129963 A1 * | 4/2001 | | ............... | H03F 1/32 |
| WO | WO0129963 A1 * | 4/2001 | | ............... | H03F 1/32 |

\* cited by examiner

*Primary Examiner* — Yuwen Pan
*Assistant Examiner* — Zhitong Chen (57) ABSTRACT

A transceiver coupled to an antenna includes: (a) a multi-port filter having a bidirectional port coupled to the antenna, at least one input port and at least one output port; (b) a transmit datapath receiving a transmission signal and providing the transmission signal for transmission by the antenna through the multi-port filter, the transmit datapath being coupled to the input port of the multi-port filter; (c) a receive datapath receiving a reception signal from the antenna, the receive datapath being coupled to the output port of the multi-port filter; (d) a band-pass filter coupled to the antenna for receiving a sampled signal that includes intermodulation components between two or more of an external signal, the transmission signal and the reception signal; and (e) a monitoring and cancellation circuit receiving the transmission signal, the reception signal and the sampled signal to cancel the intermodulation components.

23 Claims, 9 Drawing Sheets

IN-SERVICE MONITORING AND CANCELLATION OF PASSIVE INTERMODULATION INTERFERENCES

BACKGROUND OF THE INVENTION

1. Field of the Invention

The present invention relates to a transmitter-receiver of a wireless communication system. In particular, the present invention relates to cancellation of passive intermodulation interferences in a transmitter-receiver of a wireless communication system.

2. Discussion of the Related Art

Figure 1:
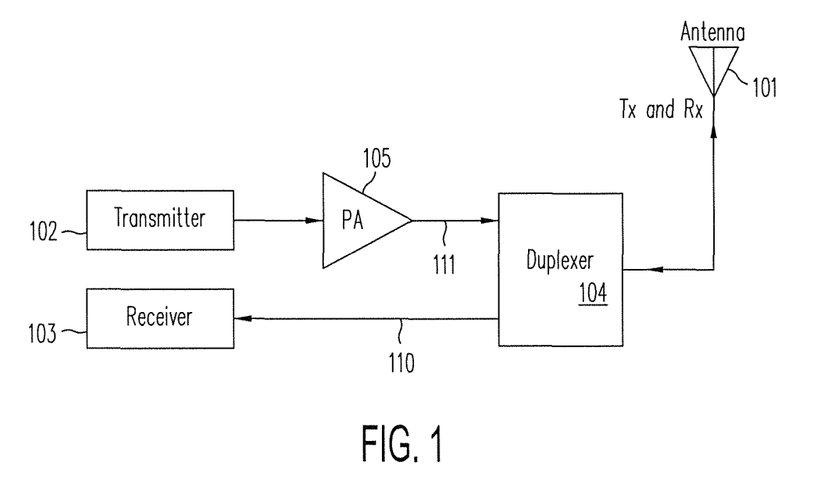
FIG. 1 is a block diagram of base-station station 100 in a wireless communication system using frequency-division-duplexed (FDD), with antenna 101 being shared between downlink transmitter 102 and uplink receiver 103.

In a wireless base station, the sensitivity of an uplink receiver can be severely degraded by undesirable interfering signals within the uplink frequency band. FIG. 1 is a block diagram of base-station station 100 in a wireless communication system using frequency-division-duplexed (FDD), with antenna 101 being shared between downlink transmitter 102 and uplink receiver 103. As shown in FIG. 1, duplexer 104 is a three-port radio-frequency (RF) filter that isolates reverse-direction receiver signal 110 from forward-direction transmitter signal 111. Forward-direction transmitter signal 111, which is provided by power amplifier (PA) 105, is typically a high-power RF signal. From duplexer 104, transmitter signal 101 is sent into free space by antenna 101. Nonlinear junctions in degraded antenna components (e.g. connectors) and rusty objects near antenna 101 (e.g. metal fences) introduce passive-intermodulation (PIM) interference in the reverse direction (i.e., back to receiver 102). The PIM effect is thus also known as "the rusty-bolt effect" and has been recognized by the wireless industry as a difficult and complicated problem.

PIM interferences may be detected during antenna installation with currently available instruments using a high-power, two-tone signal. However, PIM problems often surface as a result of gradual degradation only years after installation. Carrying out instrument-based PIM test interrupts the service. Furthermore, when a base station has begun service, an instrument test may not be allowable because the PIM test sends a high-power RF signal into free space in a frequency band that is not licensed to the service provider.

SUMMARY

According to one embodiment of the present invention, a transceiver coupled to an antenna includes: (a) a multi-port filter having a bidirectional port coupled to the antenna, at least one input port and at least one output port; (b) a transmit datapath receiving a transmission signal and providing the transmission signal for transmission by the antenna through the multi-port filter, the transmit datapath being coupled to the input port of the multi-port filter; (c) a receive datapath receiving a reception signal from the antenna, the receive datapath being coupled to the output port of the multi-port filter; (d) a band-pass filter coupled to the antenna for receiving a sampled signal that includes intermodulation components between two or more of an external signal, the transmission signal and the reception signal; and (e) a monitoring and cancellation circuit receiving the transmission signal, the reception signal and the sampled signal to cancel the intermodulation components.

According to one embodiment of the present invention, the intermodulation components may be intermodulation between the transmission signal and the reception signal or between the external signal and the transmission signal. The external signal may have a frequency component with a predetermined frequency band of the transmission signal, or the external and the transmission signal may have different non-overlapping frequency bands.

According to one embodiment of the present invention, the sampled signal may be obtained through a coupler tapping the bidirectional port of the multi-port filter or tapping the input port of the multi-port filter. Alternatively, the sampled signal is obtained from a second output port of the multi-port filter.

According to one embodiment of the present invention, the transmit datapath may include a crest factor reduction processor. The transmit datapath may include: (i) a digital-to-RF converter that converts the transmission signal into an RF signal; (ii) an analog linearizer for providing pre-distorted RF signal; and (iii) a power amplifier for amplifying the pre-distorted RF signal for transmission by the antenna. Alternatively, the transmit datapath may include (i) a digital signal processor that receives the transmission signal to provide a pre-distorted transmission signal; (ii) a digital-to-RF converter that converts the pre-distorted transmission signal into an RF signal; and (iii) a power amplifier for amplifying the RF signal for transmission by the antenna.

According to one embodiment of the present invention, the monitoring and cancellation circuit includes an intermodulation cancellation circuit which models non-linearity in the intermodulation components. In some embodiments, the non-linearity is modeled according to a polynomial function. In some embodiments, the non-linearity is modeled according to a rational approximation technique. The intermodulation cancellation circuit may include delay elements for aligning in time at least two of: the transmission signal, the reception signal and the sampled signal. The intermodulation cancellation circuit may include a low-pass filter and one or more local oscillators. In one embodiment, one of the local oscillators has a frequency corresponding the uplink-downlink frequency spacing. In another embodiment, the local oscillator has a frequency corresponding to the spacing between the transmission signal and the external signal.

According to one embodiment of the present invention, the intermodulation cancellation circuit operates according to a set of adaptively adjusted parameters. The parameters of the intermodulation cancellation circuit are adjusted based on minimization of a cost function. The cost function may be minimized according to a mean-square-error criterion or a weighted mean-square of an error signal or its spectrum. Alternatively, the cost function may be minimized according to a quality-of-signal figure of merit. The quality-of-signal figure of merit corresponds to a signal-to-interference ratio or to an error vector magnitude.

The present invention is better understood upon consideration of the detailed description below and the accompanying drawings.

BRIEF DESCRIPTION OF THE DRAWINGS

Like elements in the figures are assigned like reference numerals.

DETAILED DESCRIPTION OF THE PREFERRED EMBODIMENTS

In an FDD system, the inventors recognize that there are at least three classes of PIM interferences. The first class—"Class-A PIM interference"—is caused by self-mixing of a PA output signal at nonlinear junctions. In this detailed description, BW denotes the bandwidth of desired transceiver signals and $f_R$ denotes the downlink/uplink frequency spacing. For example, in a base station that operates in band #2 under 3GPP Long Term Evolution (LTE), where the downlink frequency range is 1930~1990 MHz, the uplink frequency range is 1850~1910 MHz, $f_R$=80 MHz and BW≤60 MHz. Thus, in this system, when the condition BW>$f_R$/(m+1) is satisfied, the (2m+1)-th order intermodulation falls into the receiver band. In such a system, the Class-A PIM is problematic for FDD bands that have relatively large bandwidth and relatively small downlink/uplink spacing.

Among the different orders of PIM effects, the $3^{rd}$-order effect has the highest intermodulation power. The following table shows the LTE bands (as defined in 3GPP TS36.104) where the $3^{rd}$-order PIM can occur.

TABLE 1

| LTE operating band # | Downlink frequency range (MHz) | Uplink frequency range (MHz) | Maximum bandwidth (MHz) | Frequency spacing (MHz) |
|---|---|---|---|---|
| 12 | 729~746 | 699~716 | 17 | 30 |
| 5 | 869~894 | 824~849 | 25 | 45 |
| 8 | 925~960 | 880~915 | 35 | 45 |
| 3 | 1805~1880 | 1710~1785 | 75 | 95 |
| 2 | 1930~1990 | 1850~1910 | 60 | 80 |
| 7 | 2620~2690 | 2500~2570 | 70 | 120 |

PIM may be caused by the nonlinear interaction between a local PA output signal and an external signal from a nearby antenna, as a result of the external signal feeding into the local antenna by virtue of inter-antenna coupling. "Class-B PIM interference" occurs when the local PA output signal and the external signal occupy different portions of the same down-link frequency band. The LTE bands shown in Table 1 above are susceptible to class-B PIM interference.

"Class-C PIM interference" occurs when the local PA output signal and the external signal belong to different downlink bands. Table 2 shows a list of FDD-mode LTE bands that can have Class-C PIM interference due to $3^{rd}$-order PIM. For example, the $3^{rd}$-order PIM between the LTE downlink band #4 (2110~2155 MHz) and band #2 (1930~1990 MHz) may fall into the uplink band #4 (1710~1755 MHz). Reducing the bandwidth of the local PA signal may suppress class-A PIM interference, but would have little or no effect on Class-B and Class-C PIM interferences.

TABLE 2

| LTE operating band # | Local uplink band (MHz) | Local downlink band (MHz) | External downlink band #, mode | External downlink range (MHz) |
|---|---|---|---|---|
| 1 | 1920~1980 | 2110~2170 | 40, TDD | 2300~2400 |
| 2 | 1850~1910 | 1930~1990 | 34, TDD | 2010~2025 |
| 3 | 1710~1785 | 1805~1880 | 33, TDD | 1900~1920 |
| 3 | 1710~1785 | 1805~1880 | 2, FDD | 1930~1990 |
| 4 | 1710~1755 | 2110~2155 | 2, FDD | 1930~1990 |
| 5 | 824~849 | 869~894 | 8, FDD | 925~960 |
| 6 | 830~840 | 875~885 | 8, FDD | 925~960 |
| 9 | 1750~1785 | 1845~1880 | 2, FDD | 1930~1990 |
| 10 | 1710~1770 | 2110~2170 | 2, FDD | 1930~1990 |
| 12 | 699~716 | 729~746 | 14, FDD | 758~768 |
| 14 | 788~798 | 758~768 | 12, FDD | 729~746 |

Figure 2:
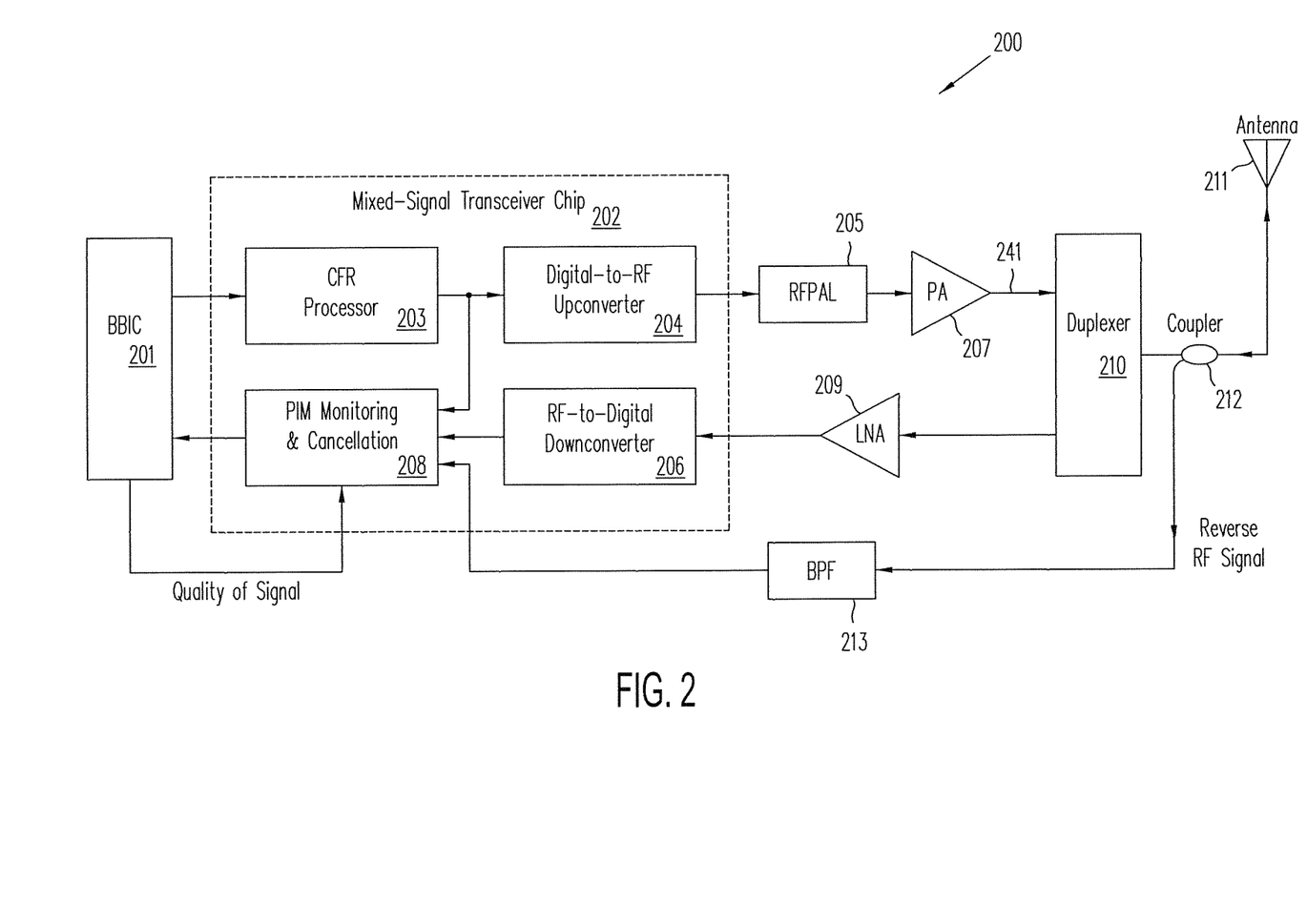
FIG. 2 is a block diagram of FDD-mode wireless transceiver system 200 that supports PIM monitoring and cancellation, in accordance with an embodiment of the present invention.

The present invention mitigates PIM interferences by providing PIM monitoring and cancellation. FIG. 2 is a block diagram of FDD-mode wireless transceiver system 200 that supports PIM monitoring and cancellation, in accordance with an embodiment of the present invention. As shown in FIG. 2, system 200 includes digital baseband integrated circuit 201 ("BBIC"), which performs baseband signal data processing. Mixed-signal transceiver integrated circuit 202 interfaces the digital processing domain and the RF or analog signal domain. Mixed signal transceiver integrated circuit 202 includes a transmitter portion with crest-factor reduction (CFR) processor 203, which is followed by digital-to-RF up-converter 204. Examples of crest factor reduction methods that are suitable for implementation in CFR processor 203 may be found in the copending U.S. patent application Ser. No. 13/897,119, entitled "Crest Factor Reduction for Band-Limited Multi-Carrier Signals" filed May 17, 2013. The disclosure of the '719 application is hereby incorporated by reference in its entirety. Power amplifier (PA) 207 may be linearized by either predistortion techniques in the RF domain or digital predistortion techniques in baseband. FIG. 2 shows RF power amplifier linearizer (RFPAL) 205, which applies predistortion techniques to an RF signal to linearize power amplifier 207. RFPAL 205 use techniques that are developed at Scintera Network, Inc., Santa Clara, Calif. As shown in FIG. 2, the linearized signal of PA 207 is provided to duplexer 210, which is then transmitted into free space by antenna 211.

In FIG. 2, antenna 211 is also used to receive from free space an RF signal for mixed signal transceiver integrated circuit 202. The RF signal to be received into the receiver portion of mixed signal transceiver integrated circuit 202 is forwarded by duplexer 210 to RF-to-digital down-converter 206, after suitably amplified by low noise amplifier (LNA) 209. RF-to-digital converter 206 provides as output a complex-valued digital signal denoted by r(t). The r(t) signal, referred to as the reception signal, contains the desired signal component, as well as superimposed PIM interferences. For example, Class-B or Class-C PIM interferences may be present as a result of an interaction between PA output signal 241 and an external signal. The external signal may feed into antenna 211 towards mixed signal transceiver integrated circuit 202. In FIG. 2, coupler 212 placed between the output port of duplexer 204 and the input port of antenna 211 provides a copy of the antenna reverse signal. The coupling ratio of coupler 212 may be 20~30 dB, for example. Bandpass filter (BPF) 213 suppresses undesired frequency components (e.g., antenna reflection in the frequency band of transmitter 102), but preserves the PIM interferences coupled from the external signal. Mixed signal transceiver integrated circuit 202 also includes PIM monitoring and cancellation subsystem 208, which receives (i) transmit signal s(t) from CFR processor 203, (ii) reception signal r(t) RF-to-digital down-converter 206, (iii) the filtered reverse signal from the output terminal of BPF 213, and (iv) control signal QoS ("quality of signal") from digital baseband integrated circuit 201. After canceling PIM interference, output signal y(t) is passed to digital baseband integrated circuit 201.

Figure 3:
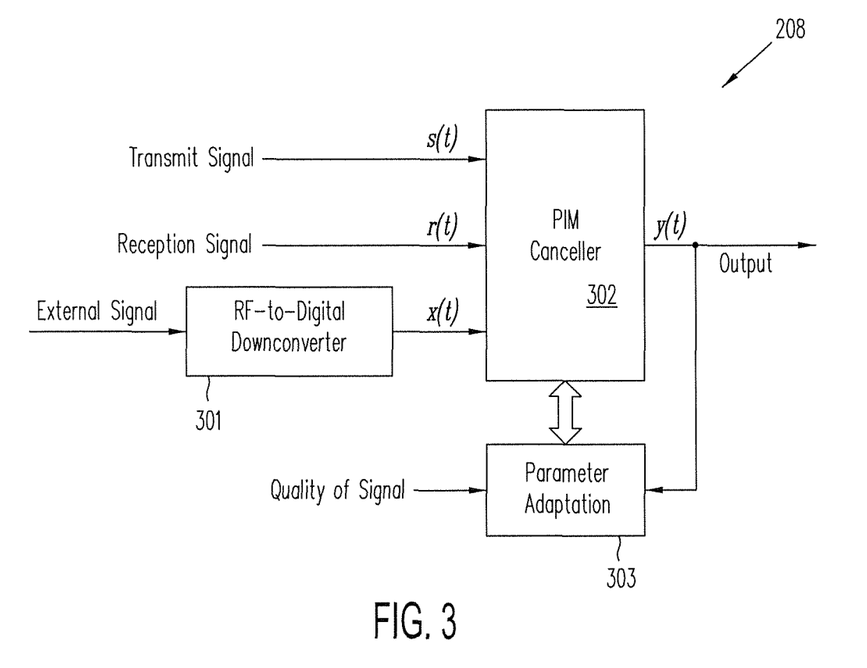
FIG. 3 is a block diagram of PIM monitoring and cancellation subsystem 208, in accordance with one embodiment of the present invention.

FIG. 3 is a block diagram of PIM monitoring and cancellation subsystem 208, in accordance with one embodiment of the present invention. As shown in FIG. 3, PIM monitoring and cancellation subsystem 208 includes RF-to-digital down-converter 301, which converts the filtered reverse signal of BPF 213 to a complex-valued digital signal denoted by x(t) ("down-converted reverse signal"). Thus, undesired frequency components in the antenna reverse signal is first removed by the RF-domain filtering in BPF 213, followed by analog filtering, digital filtering or both in RF-to-digital down-converter 301. PIM canceller 302 is a digital processor which receives transmit signal s(t), reception signal r(t), and down-converted reverse signal x(t), which are all complex-valued digital input signals. As shown in FIG. 3, the parameters of PIM canceller 302 are adaptively adjusted in parameter adaption circuit 303 based on the QoS signal to achieve best PIM cancellation performance under the current operating conditions.

Figure 4:
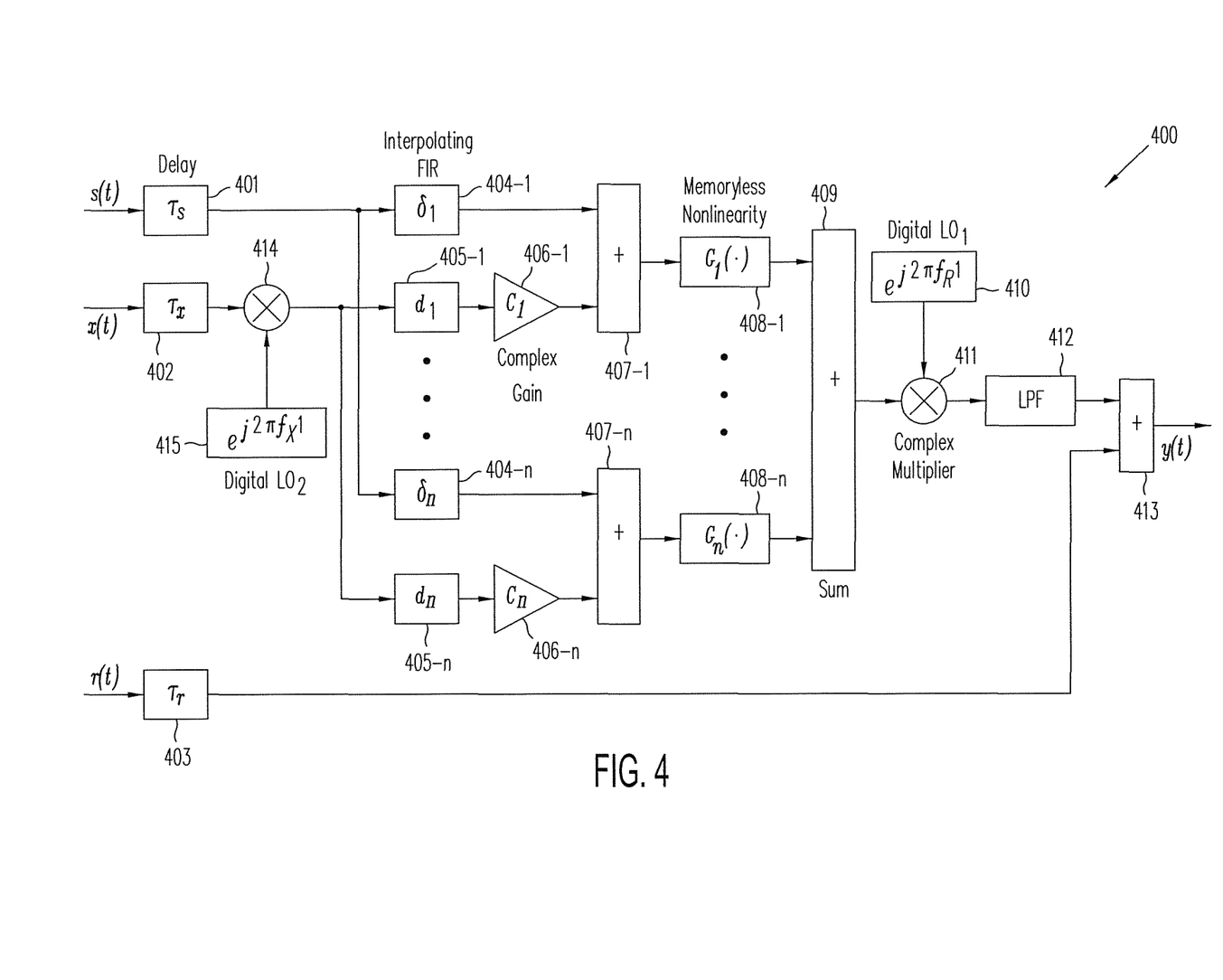
FIG. 4 shows a generalized implementation of PIM canceller 302, according to one embodiment of the present invention.

FIG. 4 shows a generalized implementation 400 for PIM canceller 302, according to one embodiment of the present invention. In FIG. 4, $\tau_s$ delay block 401, $\tau_x$ delay block 402 and $\tau_r$ delay block 403 are integer-sample delays, $G_i(\cdot)$ block 408-$i$ is i-th one of n memoryless nonlinearity models for the PIM sources, and $\delta_i$ delay block 404-$i$, $d_i$ delay block 405-$i$, $c_i$ block 406-$i$ and summer 407-$i$ form the i-th one of n interpolating FIR filters used to obtain fractional delays. $c_i$ block 406-$i$ is the i-th one of n complex gains. LPF block 412 is a low-pass filter that acts as a channel filter. Digital local oscillator 410 has frequency $f_R$, which is the downlink-uplink frequency spacing (i.e., addressing intermodulation between the signal to be received and the signal to be transmitted). Digital local oscillator 415 has frequency $f_X$, which is the external-transmit frequency spacing (i.e., addressing intermodulation between the signal being transmitted and the external signal). Therefore, output signal y(t) of PIM canceller 302 may be expressed as:

$$y(t)=r(t-\tau_r)+\text{LPF}\{e^{j2\pi f_R t}\Sigma_{i=1}^2 G_i(s(t-\tau_s-\delta_i))+ c_i e^{j2\pi f_X t}x(t-\tau_x-d_i))\} \quad (1)$$

Conventional odd-order polynomial models are often inadequate to provide good modeling of PIM source nonlinearity. According to the present invention, two modeling methods are provided for modeling PIM source nonlinearities. In the first method—the rational approximation model—the PIM source nonlinearity is expressed as:

$$G_i(z) = \frac{a_i|z|^2 z}{1 + \frac{\epsilon_i|z|}{1-\mu_i|z|}} \quad (2)$$

where z denotes a complex-valued input to the PIM source nonlinearity model, $a_i$ is a complex-valued parameter, $\epsilon_i$ and $\mu_i$ are non-negative real-valued parameters (typically, $\mu_i/\epsilon_i<0.05$). Alternatively, in the second method—$3^{rd}$-and-$4^{th}$-order polynomial model—the PIM nonlinearity is expressed as:

$$G_i(z)=a_i|z|^2 z+b_i|z|^3 z \quad (3)$$

where $a_i$ and $b_i$ are complex-valued parameters.

Figure 5:
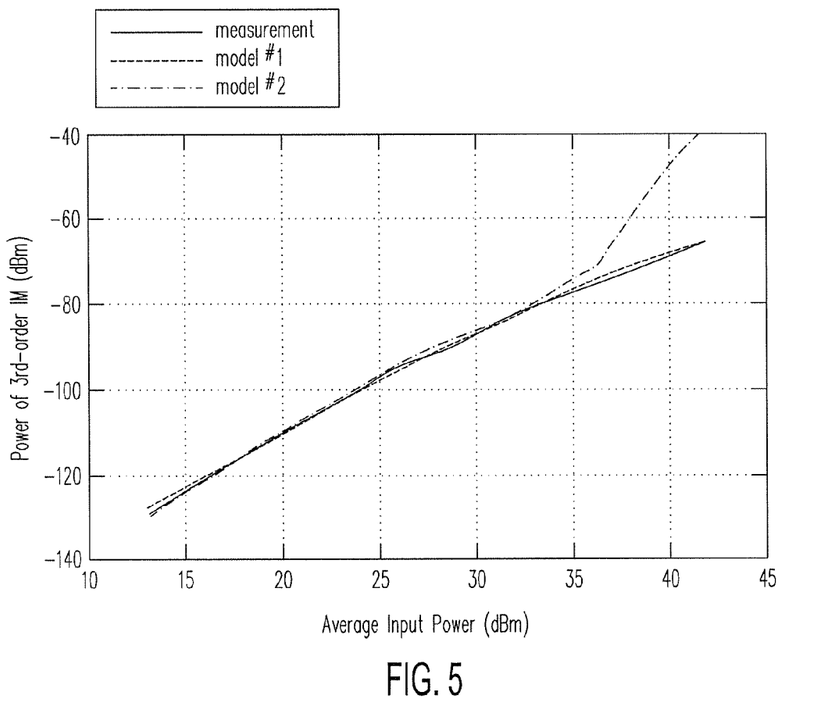
FIG. 5 shows the variation of the $3^{rd}$-order PIM power, under measurement and two analytical models, as a function of average input power for a SMC connector with balanced two-tone input.

FIG. 5 shows the variation of the $3^{rd}$-order PIM power, under measurement and two analytical models, as a function of average input power for a SMC connector with balanced two-tone input. The rational approximation model (model #2 in FIG. 5) is surprisingly accurate even for such a worst-case connector that has a PIM power of −65 dBm (at 43 dBm input). The $3^{rd}$-and-$4^{th}$-order polynomial model (model #1) is found applicable when the PIM power is lower than −85 dBm.

Figure 6:
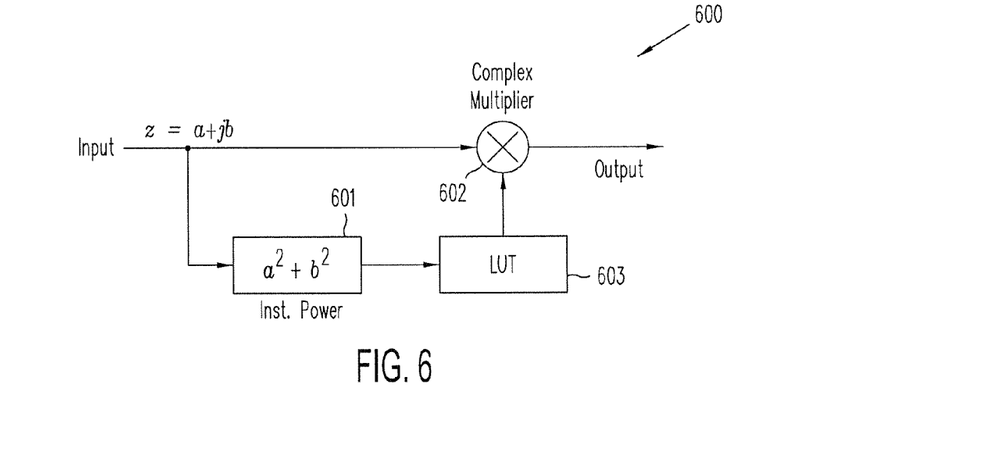
FIG. 6 is a schematic representation of digital circuit 600 for a memoryless nonlinearity model.

FIG. 6 is a schematic representation of digital circuit 600 for a memoryless nonlinearity model. As shown in FIG. 6, envelope circuit 601 provides an envelope of the complex input value z, which is used to obtain a non-linearity value under the implemented model from look-up table (LUT) 603. PIM nonlinearity $G_i(z)$ is the complex product computed in complex multiplier 602 between input value z and the model value from LUT 603. LUT 603 is programmed to hold pre-computed values for the implemented non-linearity model.

Figure 7:
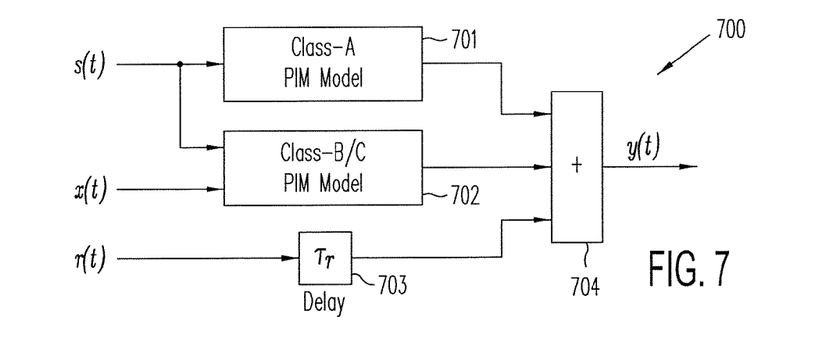
FIG. 7 shows PIM canceller 700, which is one implementation of PIM canceller 302, according to one embodiment of the present invention.

FIG. 7 shows PIM canceller 700, which is one implementation of PIM canceller 302, according to one embodiment of the present invention. In PIM canceller 700, Class-A interference and Class-B or Class-C interferences are cancelled in Class-A PIM model 701 and Class-B/C PIM model 702.

Figure 8:
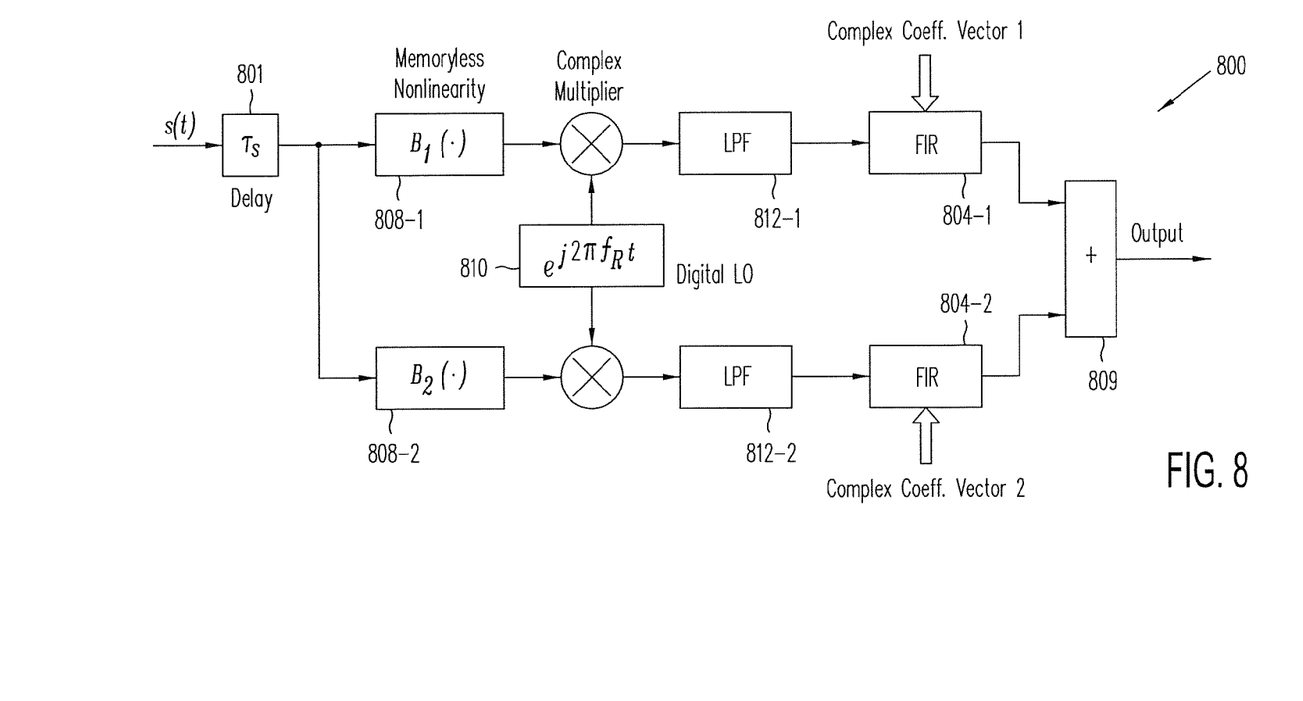
FIG. 8 shows circuit 800, which is one implementation of Class-A PIM model 701 in PIM canceller 700 of FIG. 7, according to one embodiment of the present invention.

FIG. 8 shows circuit 800, which is one implementation of Class-A PIM model 701 of FIG. 7, according to one embodiment of the present invention. Circuit 800 is a particularized implementation of circuit 400 of FIG. 4, particularized for Class-A PIM interferences. Circuit 800 assumes that there are two PIM sources. Using the rational approximation nonlinearity model, the memoryless non-linearities of $B_1(\cdot)$ and $B_2(\cdot)$ provide:

$$B_1(x) = \frac{|x|^2 x}{1 + \frac{\varepsilon_1 |x|}{1 - \mu_1 |x|}}, \; B_2(x) = \frac{|x|^2 x}{1 + \frac{\varepsilon_2 |x|}{1 - \mu_2 |x|}} \qquad (4)$$

Alternatively, using the $3^{rd}$-and-$4^{th}$-order polynomial model, the memoryless nonlinearity of $B_1(\cdot)$ and $B_2(\cdot)$ may be:

$$B_1(x) = |x|^2 x, \; B_2(x) = |x|^3 x \qquad (5)$$

Figure 9:
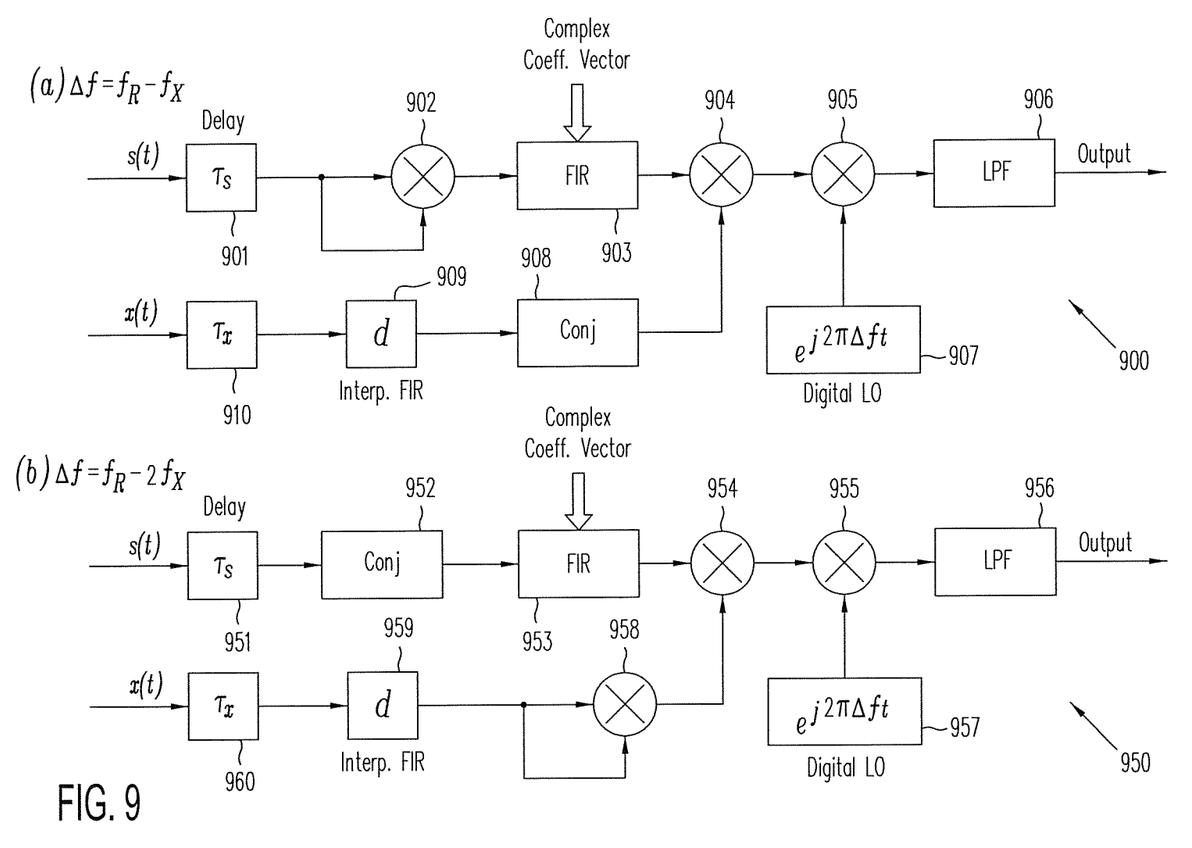
FIG. 9 shows circuits 900 and 950, which provide one implementation of Class-B/C PIM model 702 in PIM canceller 700 of FIG. 7, according to one embodiment of the present invention.

FIG. 9 shows circuits 900 and 950, which provide one implementation of Class-B/C PIM model 702 in PIM canceller 700 of FIG. 7, according to one embodiment of the present invention. In circuits 900 and 950, only the $3^{rd}$-order intermodulation between the transmit signal and the external signal is taken into account. In this embodiment, circuit 900 addresses PIM interference that occurs at $f_X \approx f_R$ and circuit 950 addresses PIM interference occurring at $f_X \approx f_R/2$. The inventors recognize that PIM interference occurs frequently at $f_X \approx f_R$ and at $f_X \approx f_R/2$. As shown in FIG. 9(a), to isolate the interference at $f_X \approx f_R$, digital local oscillator 907 is set to frequency $\Delta f = f_R - f_X$. Similarly, to isolate the interference at $f_X \approx f_R/2$, digital local oscillator 957 is set to frequency $\Delta f = f_R - 2f_X$.

The PIM cancellers of the present invention may be adaptively controlled using monitoring and adjustable control parameters. The adaptive control technique adjusts the control parameters by optimizing a cost function, for example. One example of applicable adaptive control technique is disclosed, for example, in U.S. Pat. No. 8,136,081, entitled "Method and Apparatus to Optimize Adaptive Radio-Frequency Systems," issued Mar. 13, 2012. The disclosure of the '081 patent is hereby incorporated by reference in its entirety. In one embodiment, the cost function may be constructed using one of two methods, for example.

The first method uses the PIM canceller's output signal, y(t), as an error signal for parameter identification and minimizes error signal y(t) under a mean-square-error (MSE) criterion. For example, the cost function may be the average power of the PIM canceller's output signal (i.e., conventional MSE), or a weighted mean-square of the error signal, $\int W(f)Y(f)df$, with Y(f) being the power spectrum of error signal y(t) and W(f) a spectral window.

Alternatively, under the second method, the cost function may be a quality-of-signal (QoS), e.g. the signal-to-interference ratio or the error vector magnitude (EVM) of reference symbols, obtained from demodulating the PIM canceller output signal in the BBIC. For example, in FIG. 2, baseband processor 201 provides a QoS signal based on PIM canceller 208's output error signal y(t).

Figure 10:
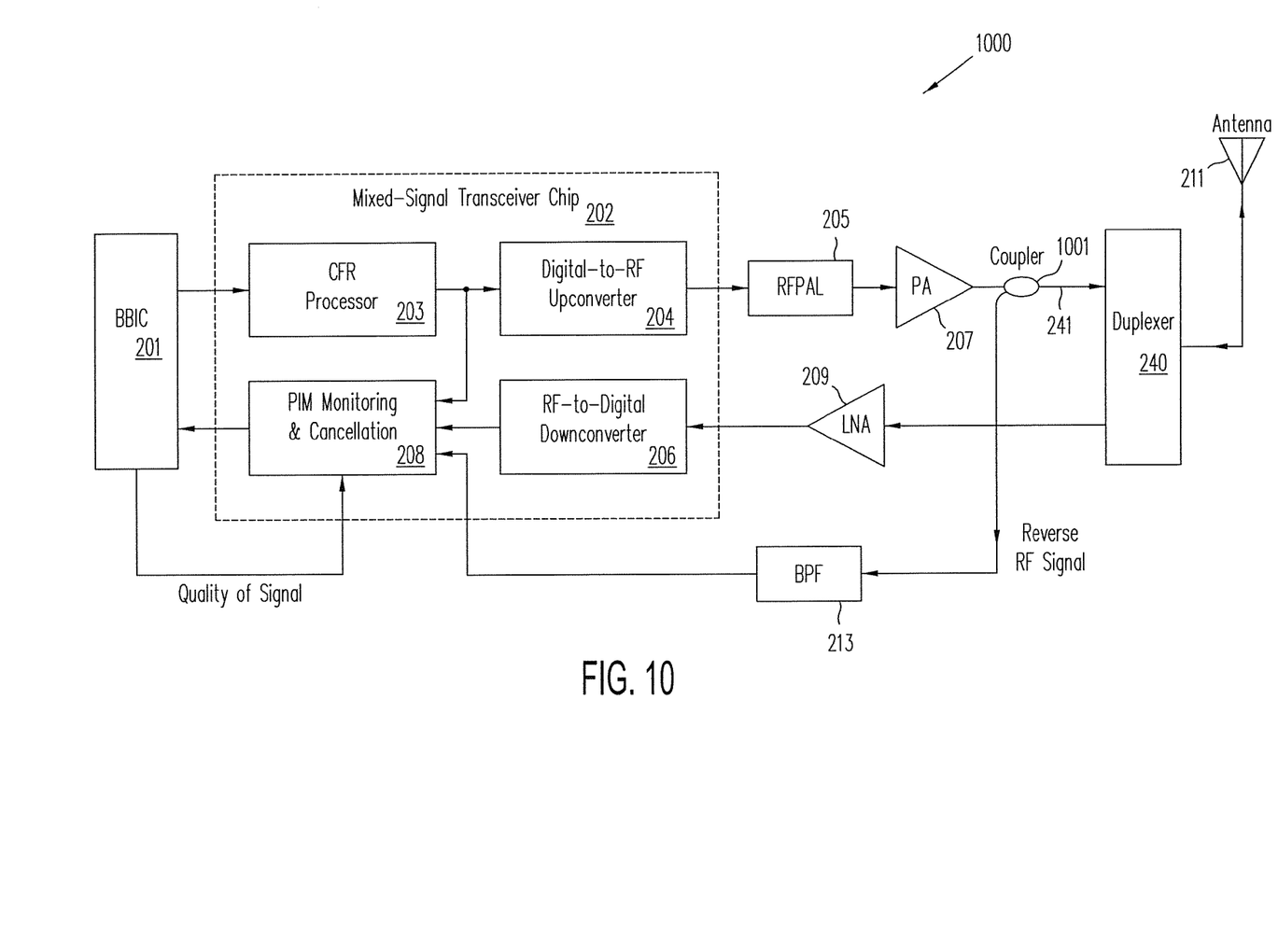
FIG. 10 shows wireless transceiver system 1000, which taps an external signal using a coupler placed between the PA and the terminal duplexer in a Class-B PIM model, according to one embodiment of the present invention.

In addition, in Class-A PIM model 702 (FIG. 8) for PIM canceller 700 (FIG. 7), the least-mean-square (LMS) algorithm provides an adaptation method for the complex-valued FIR coefficients. The LMS algorithm utilizes the correlation between the PIM canceller's output signal and a FIR tap output signal to adjust the corresponding FIR coefficients. In a Class-B PIM model (e.g., circuit 900 of FIG. 9), where intermodulation occurs between the local transmit signal and the external signal within the same downlink band, the external signal may be tapped from a coupler placed between the PA and the terminal duplexer, as shown in wireless transceiver system 1000 of FIG. 10.

Figure 11:
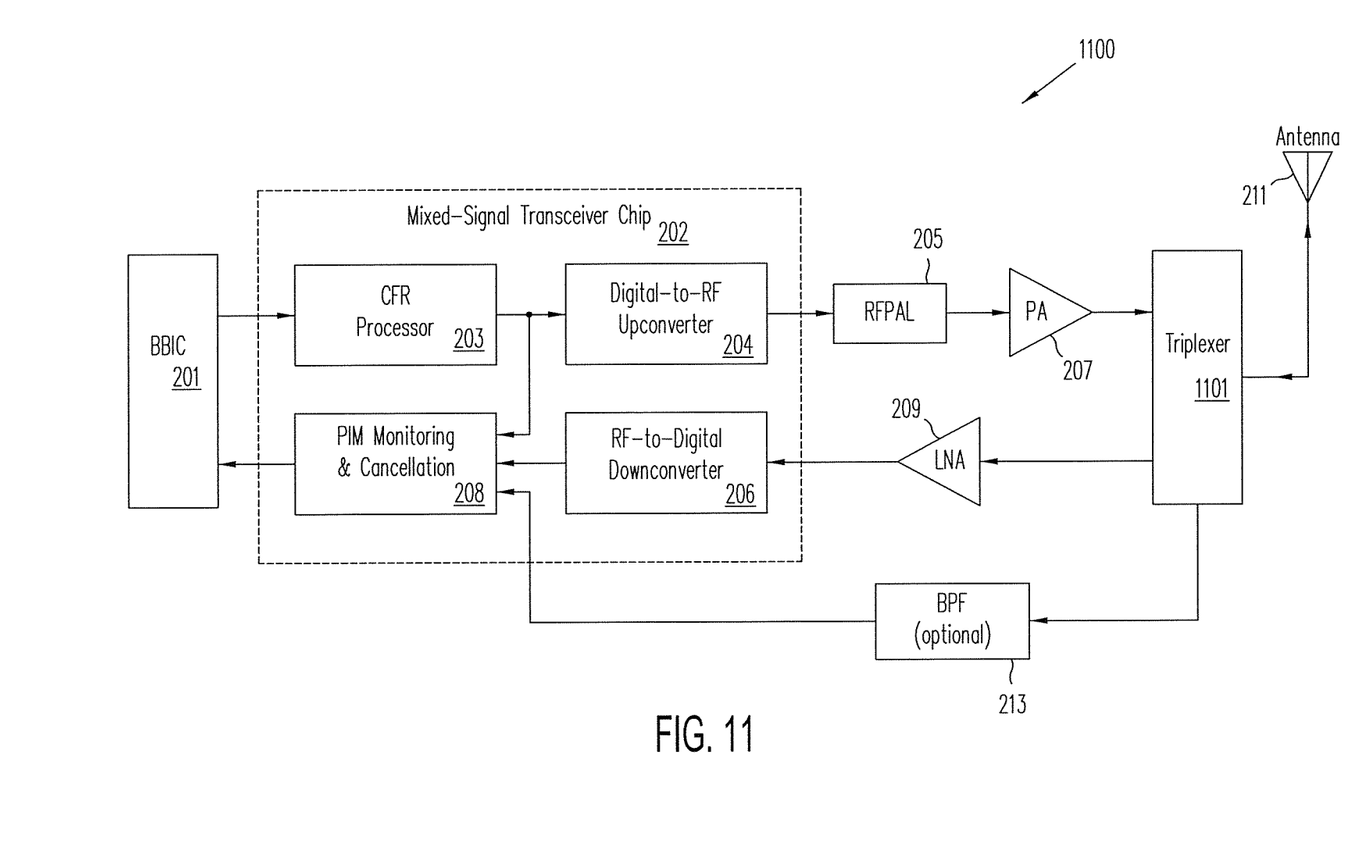
FIG. 11 shows using wireless transceiver system 1100 having a triplexer in a Class-C PIM model, as the local signal and the external signal are at different downlink bands, according to one embodiment of the present invention.

In a Class-C PIM model, as the local signal and the external signal are at different downlink bands, a triplexer may be used to provide the reverse signals in two different bands. FIG. 11 shows a system in which triplex 1101 include reception ports for extracting signals in the uplink receiver band and the external-signal band, respectively.

Figure 12:
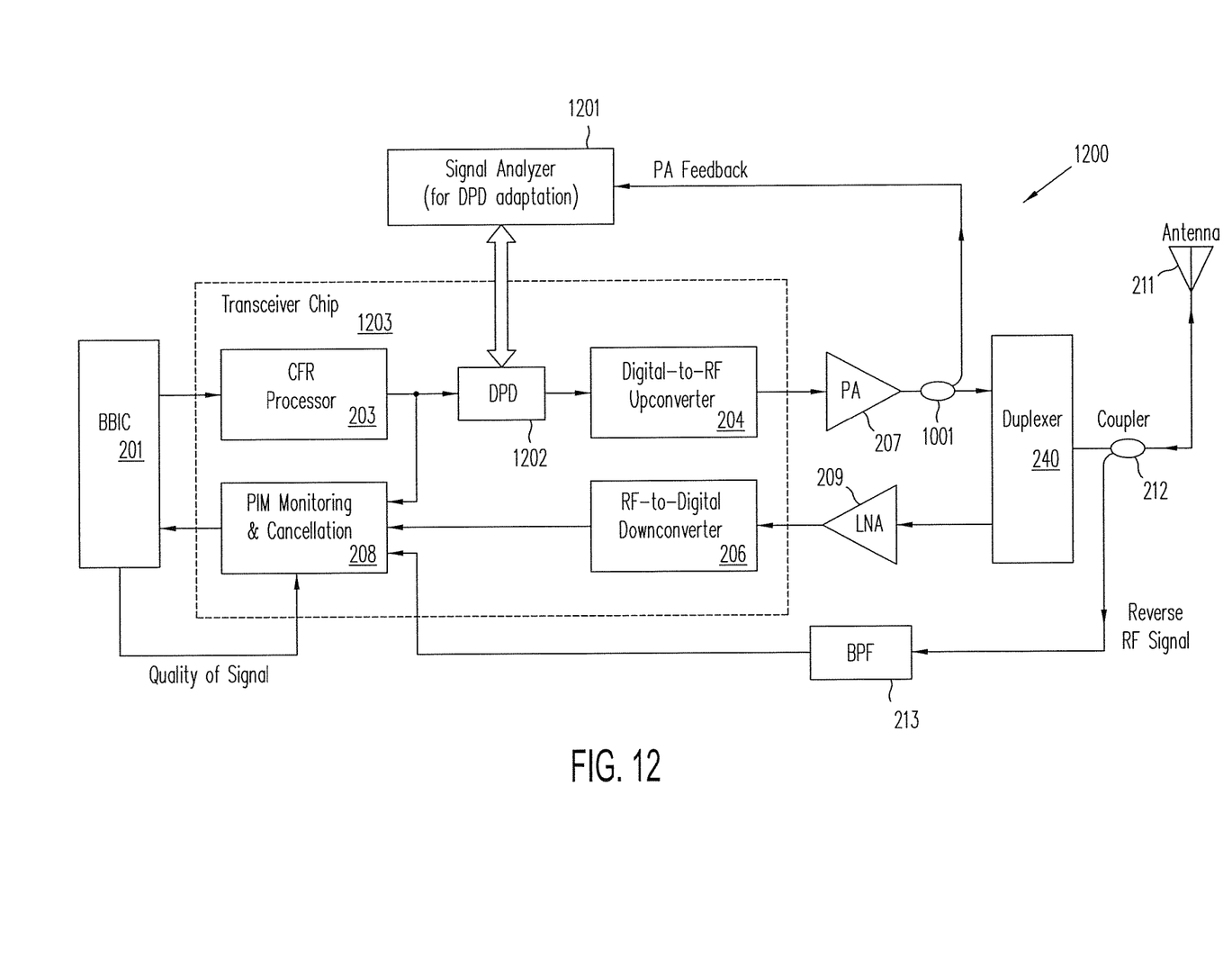
FIG. 12 shows wireless transceiver system 1200 using digital pre-distortion techniques to linearize a power amplifier, in accordance with one embodiment of the present invention.

The PIM monitoring and cancellation methods of the present invention are applicable in a transceiver system in which the PA is linearized by digital pre-distortion (DPD) techniques. FIG. 12 shows wireless transceiver system 1200 using digital pre-distortion techniques to linearize a power amplifier, in accordance with one embodiment of the present invention. Applicable digital pre-distortion techniques for wireless transceiver system 1200 are disclosed, for example, in copending U.S. patent application Ser. No. 14/166,422, entitled "Adaptively Controlled Digital Pre-distortion in an RF Power Amplifier Using an Integrated Signal Analyzer with Enhanced Analog-to-Digital Conversion," filed on Jan. 28, 2014. The disclosure of the '422 patent application is hereby incorporated by reference in its entirety. Using the techniques disclosed in the '422 patent application, the data processor in DPD subsystem 1202 is very low-power and occupies very little chip area. Hence, DPD subsystem 1202 may be easily integrated on mixed signal transceiver integrated circuit 1203. The parameters of DPD subsystem 1202 may be controlled by signal analyzer 1201. Signal analyzer 1201 need not be integrated onto mixed signal transceiver integrated circuit 1203, as the analog-to-digital converters for PA monitoring have very different requirements from those used in uplink reception.

The detailed description above is provided to illustrate the specific embodiments of the present invention and is not intended to be limiting. Numerous modifications and variations within the scope of the present invention are possible. The present invention is set forth in the accompanying claims.

We claim:

1. A transceiver coupled to an antenna, comprising:
    a multi-port filter having a bidirectional port coupled to the antenna, at least one input port and at least one output port;
    a transmit datapath receiving a transmission signal and providing the transmission signal for transmission by the antenna through the multi-port filter, the transmit datapath being coupled to the input port of the multi-port filter;
    a receive datapath receiving a reception signal from the antenna, the receive datapath being coupled to the output port of the multi-port filter;
    a band-pass filter coupled to the antenna for receiving a sampled signal that includes intermodulation components between two or more of an external signal, the transmission signal and the reception signal; and
    a monitoring and cancellation circuit receiving the transmission signal, the reception signal, an output of the band-pass filter, and a feedback signal from a baseband processor to cancel the intermodulation components,
    wherein the baseband processor generates the feedback signal based on an output of the monitoring and cancellation circuit,
    wherein parameters of the monitoring and cancellation circuit are adjusted based on the feedback signal to cancel the intermodulation components under current operating conditions, and
    wherein the parameters of the monitoring and cancellation circuit are adjusted by minimizing a cost function according to a quality-of-signal figure of merit provided by the feedback signal, the quality-of-signal figure of merit including a signal-to-interference ratio or an error vector magnitude of reference symbols, obtained from demodulating an output of the monitoring and cancellation circuit.

2. The transceiver of claim 1, wherein the intermodulation components comprise intermodulation between the transmission signal and the reception signal.

3. The transceiver of claim 1, wherein the intermodulation components comprise intermodulation between the external signal and the transmission signal.

4. The transceiver of claim 3, wherein the external signal has a frequency component with a predetermined frequency band of the transmission signal.

5. The transceiver of claim 1, wherein the external signal and the transmission signal have different frequency bands.

6. The transceiver of claim 1, further comprising a coupler tapping the bidirectional port of the multi-port filter to provide the sampled signal to the band-pass filter.

7. The transceiver of claim 1, further comprising a coupler tapping the input port of the multi-port filter to provide the sampled signal to the band-pass filter.

8. The transceiver of claim 1, wherein the multi-port filter includes a second output port providing the sampled signal to the band-pass filter.

9. The transceiver of claim 1, wherein the transmit datapath comprises a crest factor reduction processor.

10. The transceiver of claim 1, wherein the transmit datapath comprises:
    a digital-to-RF converter that converts the transmission signal into an RF signal;
    an analog linearizer for providing pre-distorted RF signal; and
    a power amplifier for amplifying the pre-distorted RF signal for transmission by the antenna.

11. The transceiver of claim 1, wherein the transmit datapath comprises:
    a digital signal processor that receives the transmission signal to provide a pre-distorted transmission signal;
    a digital-to-RE converter that converts the pre-distorted transmission signal into an RF signal; and
    a power amplifier for amplifying the RF signal for transmission by the antenna.

12. The transceiver of claim 1, wherein the receive datapath comprises an RF-to-digital converter that converts the reception signal to digital form.

13. The transceiver of claim 12, wherein the monitoring and cancellation circuit comprises a second RF-to-digital converter that converts the sampled signal to digital form.

14. The transceiver of claim 13, wherein the monitoring and cancellation circuit further comprises an intermodulation cancellation circuit.

15. The transceiver of claim 14, wherein the intermodulation cancellation circuit comprises a circuit that models non-linearity in the intermodulation components.

16. The transceiver of claim 15, wherein the non-linearity is modeled according to a polynomial function.

17. The transceiver of claim 15, wherein the non-linearity is modeled according to a rational approximation technique.

18. The transceiver of claim 14, wherein the intermodulation cancellation circuit further comprises delay elements for aligning in time at least two of: the transmission signal, the reception signal and the sampled signal.

19. The transceiver of claim 14, further comprising a low-pass filter.

20. The transceiver of claim 14, further comprising a local oscillator.

21. The transceiver of claim 20, wherein the local oscillator has a frequency corresponding a uplink-downlink frequency spacing.

22. The transceiver of claim 20, wherein the local oscillator has a frequency corresponding to a spacing between the transmission signal and the external signal.

23. The transceiver of claim 1, wherein the cost function is minimized according to a mean-square-error criterion or a weighted mean-square of an error signal or its spectrum.

\* \* \* \* \*

UNITED STATES PATENT AND TRADEMARK OFFICE
CERTIFICATE OF CORRECTION

PATENT NO. : 9,461,697 B2  
APPLICATION NO. : 14/192513  
DATED : October 4, 2016  
INVENTOR(S) : Qian Yu et al.

Page 1 of 1

It is certified that error appears in the above-identified patent and that said Letters Patent is hereby corrected as shown below:

In the Specification

Column 6, Equation 1  Delete "$y(t) = r(t-\tau_r) + LPF\{e^{j2\pi fR t}\Sigma_{i=1}^{2} G_i(s(t-\tau_s-\delta_i) + c_i e^{j2\pi fX t}x(t-\tau_x-d_i))\}$"

and insert -- $y(t) = r(t-\tau_r) + LPF\{e^{j2\pi fR t}\sum_{i=1}^{n} G_i(s(t-\tau_s-\delta_i) + c_i e^{j2\pi fX t}x(t-\tau_x-d_i))\}$ --

Column 6, Line 67  Delete "$B_2(\cdot)$" and insert --$B_2(\cdot)$--

In the Claims

Column 9, Claim 11, Line 37  Delete "digital-to-RE" and insert --digital-to-RF--

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*